United States Patent [19]

Wajnikonis

[11] Patent Number: 4,949,919
[45] Date of Patent: Aug. 21, 1990

[54] FOIL

[76] Inventor: Krzysztof Wajnikonis, 63 Jeddo Road, London, England, W12 9EE

[21] Appl. No.: 395,151

[22] Filed: Aug. 17, 1989

Related U.S. Application Data

[63] Continuation of Ser. No. 61,280, filed as PCT GB86/00536 on Sept. 19, 1986, published as WO87/01345 on Mar. 12, 1987, abandoned.

[30] Foreign Application Priority Data

Sep. 9, 1985 [GB] United Kingdom ............... 8522270

[51] Int. Cl.$^5$ .................... B64C 3/10; B63B 1/24; B63B 3/38; B63B 41/00
[52] U.S. Cl. .................... 244/35 R; 244/45 R; 114/274; 114/140; 114/127
[58] Field of Search ............. 114/274, 140, 127; 244/35 R, 45 R

[56] References Cited

U.S. PATENT DOCUMENTS 3,547,063 12/1970 Follett ......................... 114/274
4,417,708 11/1983 Negri ........................... 244/45 R
4,635,577 1/1987 Palmquist ..................... 114/274

FOREIGN PATENT DOCUMENTS

3442921 6/1986 Fed. Rep. of Germany ...... 114/127
2489239 3/1982 France .......................... 114/140

Primary Examiner—Joseph F. Peters, Jr.
Assistant Examiner—James M. Kannofsky

[57] ABSTRACT

Hydrofoil families which have high lift and low drag coefficients. Induced vorticity is partly suppressed by introducing a longitudinal component of the flow directed from the foil tip towards the hydrofoil base at least in the area of the hydrofoil tip. Further increase of the hydrofoil efficiency is attained by reducing the low lift and high drag induced vortex enhancing area along the tip. For given lift requirements the foil area can be reduced and cavitation performance improved. High torsional and bending resistance are attained by using high modulus materials arranged in chosen directions.

15 Claims, 4 Drawing Sheets $$\Gamma = \oint_K V ds$$

FOIL

This application is a continuation of application Ser. No. 07/061,280 filed as PCT GB86/00536 on Sept. 19, 1986, published as WO87/01345 on Mar. 12, 1987, now abandoned.

The present invention relates to a foil, and particularly, but not exclusively to families of hydrofoils and aerofoils characterised by high efficiency which are forward raked.

A hydrofoil includes several features which are defined below to assist in the understanding of the specification.

Figure 1:
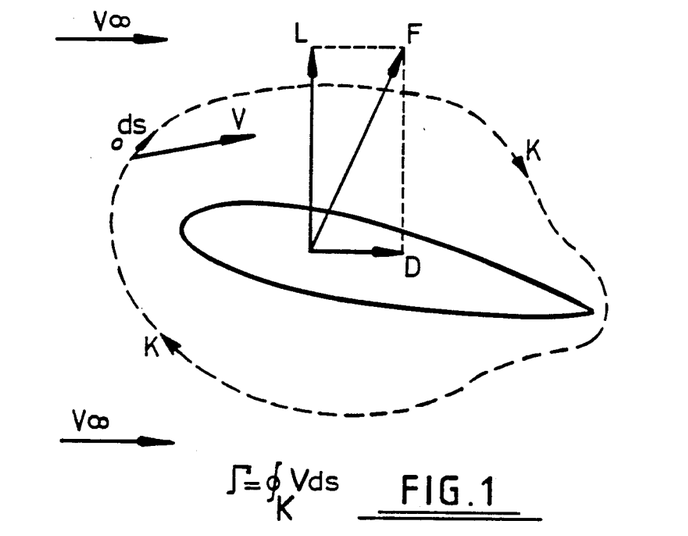
FIG. 1 is a diagrammatic representation of a hydrofoil in which F=hydrodynamic force vector; L=lift force vector; D=drag force vector; $V_\infty$=undisturbed flow velocity vector; V=local flow velocity vector; K=directed closed curve; ds=infinitely small directed element of curve K (vector), and $\Gamma$=circulation.

A hydrofoil is defined as any solid body or part thereof, that is fixed or rotating in relation to any other body, for which there exists such an orientation of the hydrofoil in relation to a non-zero undisturbed flow velocity $V_\infty$, that the circulation $\Gamma$ of the velocity field along a closed directed curve K drawn around the hydrofoil is not equal to zero. This is depicted in FIG. 1 of the drawings.

For such flows where $\Gamma \neq 0$, pressure difference occurs between the regions of the fluid around the hydrofoil. Lift force L is perpendicular to the direction of V, and is the result of this pressure difference on the surface of the hydrofoil. For real (viscous), three dimensional flows around a hydrofoil there also exists another component of the total hydrodynamic force F acting on the hydrofoil in the direction of $V_\infty$, which is called drag D. Coefficients $C_L$, $C_D$, $C_M$ are normally introduced for hydrofoils and are called $C_L$, the lift coefficient, $C_D$, the drag coefficient and $C_M$, the pitching moment coefficient.

Examples of hydrofoils and aerofoils are: fins, wings, propeller blades, pump impeller blades, turbine vane and rotor blades, stabilising fins, hydrofoil wings, rudders, keels, flettner rotors, centreboards, daggerboards, sideboards, skegs, entire underwater parts of hulls of most ships etc.

A hydrofoil base is a section or an end of the hydrofoil, which is either fixed to another body or where the continuation of the same body changes considerably its hydrofoil properties in a way that its local section value of the ratio $C_L/C_D$ is reduced or vanishes, or where the fluid medium discontinues because of a solid or free surface, or alternatively the base of a hydrofoil is its section by a plane of symmetry of the hydrofoil. Examples of hydrofoil bases are: a connection of a fin to a structure, a section of a hydrofoil wing where it protrudes from water to air, a plane of symmetry of a wing shaped submersible vessel etc.

The hydrofoil tip is defined as an end part of the hydrofoil which is not its base and the hydrofoil main line is defined as the geometrical locus of the centre of efforts of hydrofoil sections by families of planes or cylinders which section the foil surface in such a way that each plane or cylinder surface passes through one point of the leading edge and one of the trailing edge. The hydrofoil main line lies on the surface created by all the section mean lines of the hydrofoil. The sectioning surface (planes or cylinders or other rotational surfaces if they are more appropriate) should be approximately in line with the streamlines around the hydrofoil. These streamlines should start in the region of the leading edge and pass around both the pressure and the suction sides of the hydrofoil.

The hydrofoil plan plane is determined by minimising the squares of distances of points of both surfaces of the hydrofoil (multiple linear regression). In case the hydrofoil suction and pressure surfaces are identical it is the hydrofoil plane of symmetry, otherwise it shall be determined by using the coordinates of 40 points evenly distributed on both pressure and suction surfaces of the hydrofoil (20 on each side). The orthogonal projection of the surface of the hydrofoil on the plan plane shall be called the hydrofoil plan. The hydrofoil chord surface is defined as the surface which is formed by the hydrofoil chords. Each of the chord lines shall be that of individual above-defined sections.

The hydrofoil perpendicular is determined for individual points of the hydrofoil chord surface. It is the direction of a straight line which is tangent to the chord surface and perpendicular to the undisturbed flow velocity $V_\infty$ in the given point of the chord surface.

Various angles associated with the hydrofoil are defined below and are illustrated in FIGS. 2a-2e.

Figures 2A, 2B:
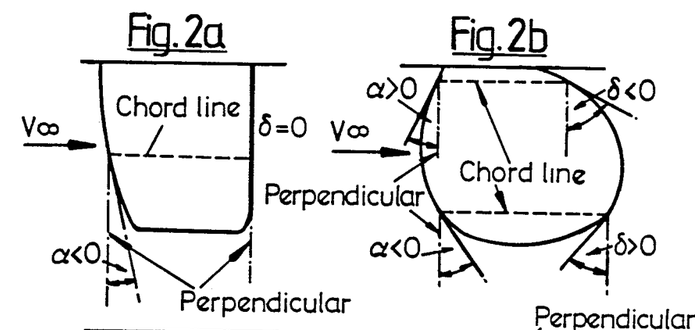
FIGS. 2a to f are diagrammatic representations of hydrofoils in which angles $\alpha$, $\beta$, $\gamma$, $\delta$ and $\epsilon$, are shown and also the chord line, hydrofoil perpendicular, hydrofoil main line, and hydrofoil maximum thickness line are shown.
Figure 2C:
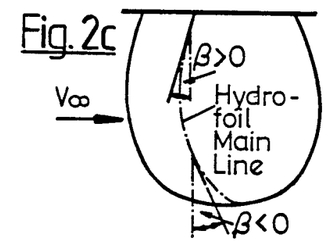
Figure 2D:
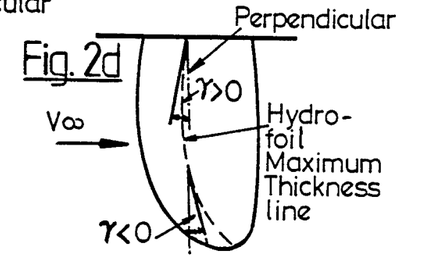

Angle $\alpha$ measured, at each point along the leading edge, is defined as the angle between the hydrofoil perpendicular and the tangent to the leading edge FIGS. 2a,b). Angle $\alpha$ is measured between the directions on the leading edge and the hydrofoil perpendicular, both towards the tip or both towards the hydrofoil base. Angle $\alpha$ has the opposite sign to that of the cosine of the angle measured between the direction of $V_\infty$ and the tipwards direction on the tangent to the leading edge.

Angle $\beta$ (seen in FIG. 2c) is determined in the same way as angle $\alpha$, with the leading edge replaced by main line.

Angle $\gamma$ (seen in FIG. 2d) is determined in the same way as angles $\alpha$ and $\beta$, and shall be measured to the tangent of the maximum thickness line.

Angle $\delta$ (FIG. 2a,b) is measured in the same way as angles $\alpha$, $\beta$ and $\gamma$ above to the direction of the trailing edge.

Figure 2E:
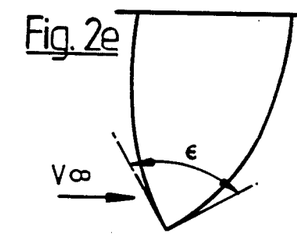
Figure 2F:
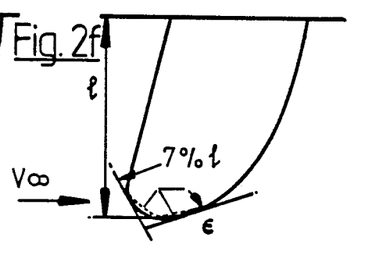

Angle $\epsilon$, (best seen in FIGS. 2e and 2f) is defined as the absolute value of the difference of angles $\alpha$ and $\delta$. For a sharp ended hydrofoil, as shown in FIG. 2e, it is measured at the hydrofoil tip. When the hydrofoil has a rounded tip (as shown in FIG. 2f) and the minimum value of the radius of curvature of the hydrofoil plan outline within 7% of the length of the hydrofoil from its tip is bigger than 1% of l, and not greater than 10% of l, angle $\epsilon$ is measured between the tangents at points that are 7% of l distant from the point on the hydrofoil tip which is furthermost from the hydrofoil base.

Even for highly efficient hydrofoils lift force is significantly reduced and the drag is increased in comparison with a similar infinitely long hydrofoil, because of the presence of induced vortices in the regions of the hydrofoil tips. This is diagrammatically illustrated in FIG. 3 of the drawings.

An induced vortex is the result of three dimensional flow from the pressure side to the suction side of the hydrofoil around the foil tip. The streamlines in the induced flow are usually at a large angle relating to $V_\infty$ and are considerably curved. Thus, once formed the induced vortex continues in the wake of the hydrofoil tip. The energy of generating this vortex manifests itself as the induced drag.

Figure 3:
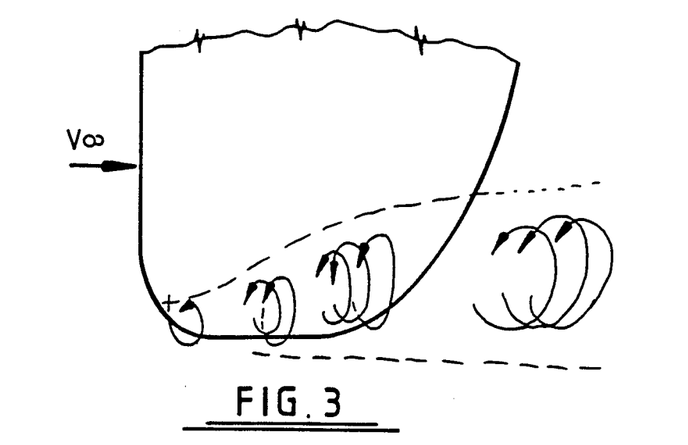
FIG. 3 is a diagrammatic view of a hydrofoil depicting vortex shedding on the hydrofoil tip.
Figures 4A, 4B:
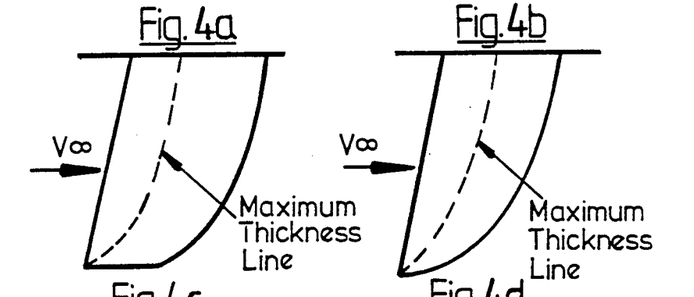
FIGS. 4a to e depict diagrammatic representations of embodiments of the invention in accordance with the invention showing lines of maximum thickness.
Figure 4C:
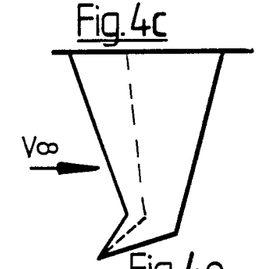
Figure 4D:
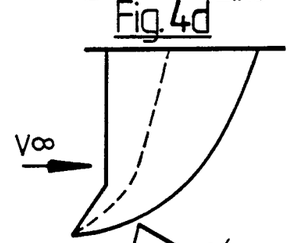
Figure 4E:
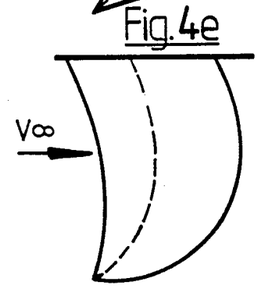
Figure 4F:
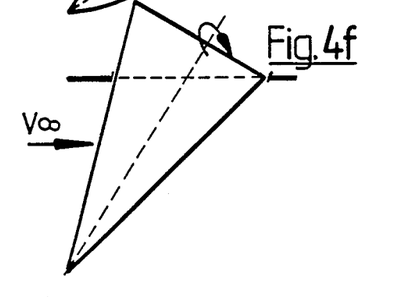

As best seen in FIG. 3, a typical hydrofoil vorticity increases along the tip edge as more and more streamlines combine together. This is further enhanced by the development of the boundary layer, the thickness of which increases along the chord. The flow in the boundary layer decelerates and smaller pressure gradients are sufficient to cause movement of relatively bigger masses of the liquid from the places of high pressures to those with lower pressures, in particular around the hydrofoil tip. This cross motion further increases the effective thickness of the boundary layer in the tip region and develops a large scale separation zone, which is accompanied by locally high viscous drag.

The best known method to improve hydrofoil efficiency (defined as the ratio $C_L/C_D$) is to increase the aspect ratio which simultaneously increases the lift coefficient and reduces the drag co-efficient. However, this method has many limitations.

There are also other ways of improving the efficiency, such as installing end plates or wings on the tip, which increases both lift and drag. Only a few designs of this type are reported to perform better than hydrofoils without end plates. However, other non-hydrodynamic factors are important in these designs. Most attempts to improve hydrofoil efficiency along these lines in recent years failed.

A limited forward inclining of hydrofoils (less than 10°) is sometimes used by dinghy sailors. One reason for putting the centreboard in the 5° to 10° forward swept position is to give more control over the position of lateral resistance of a boat under some special wind force and sailing conditions, thus obtaining a better equilibrium of the boat, which, in turn, decreases undesirable forces on the rudder. Another reason is to effect a tighter turn during gybing. This, however, is rarely performed with the foil in a fully forward inclined position. The tighter turn is possible due to lift force on the centreboard during turning, which can be enhanced by torsion of the foil.

This limited amount of forward inclining is insufficient to overcome the aforementioned disadvantages associated with existing hydrofoils.

There are similarities in pure theoretical flow case and differences in practical use, and therefore important design features, between aerofoils and hydrofoils. In the real design situations hydrofoils work in media of higher density, the forces which act on them are bigger and their dimensions in relation to the bodies they interact with, in relation to the thickness of boundary layers around these bodies etc. can be even several thousand times smaller than that in the case of an airplane wing. There are design implications of structural and weight requirements which are often completely different for particular aeorfoil and hydrofoil applications. In real hydrofoil applications cavitation is often an important phenomenon for the designer, a factor absent for aerofoils, while transonic, supersonic etc. copressibility effects are not present in uniform liquid. Hydrofoils work often close to free surface. These and other important fluid dynamics and design reasons have caused different development of many design aspects of hydrofoils and aerofoils and the development in one field is by no means readily or automatically applicable to the other. The scope of applied knowledge, or which is not the same, the scope of knowledge which is known to be applicable, are also different in the two fields, as applied geometrical features of foil plan shape have different ranges.

While forward swept foils are a novelty in the hydrofoil field, there is some limited knowledge of a recently developed forward swept wing aircraft. However the design of this aircraft does not use the advantage offered by important aspects of the here described invention. These advantages apply both to hydrofoils and aerofoils. The forward raked wing aircraft design does not take advantage of the benefits of reducing the undesirable area in the region of foil tip, which as described below, can be simply described with angle $\epsilon$ or with the value of top chord length. The elliptical or close to elliptical lengthwise chord distribution, a refinement introduced here as particularly desirable in combination with the forward rake, is also an improvement in comparison with a tapered forward raked, high tip chord length wing design of the above mentioned aircraft. The reduction of undesirable tip region area can be easily incorporated in a forward raked elliptical or similar to elliptical design and constitutes an invention both in the fields of aerofoils and hydrofoils.

An object of the present invention is to provide an improved hydrofoil which obviates or mitigates the aforesaid disadvantages.

This is achieved by inclining the whole hydrofoil or only the region of the hydrofoil tip towards the flow, or the inclination of certain characteristic lines, like the maximum thickness line which can considerably influence the velocity field in the region of the foil tip, by at least 10° towards the flow.

The longitudinal component of velocity is introduced in the tip region or along the major part of the foil. This modifies the flow in the tip region so that some of the streamlines that would otherwise have been directed around the tip from the pressure side to the suction side of the hydrofoil are instead deflected towards a more streamlined flow around the profile. An increase in local velocity near to the tip due to the longitudinal component of the flow is associated with a greater shear in the flow and the decrease in the thickness of the boundary layer. Laminar flow can exist over a larger proportion of the hydrofoil area near to the tip, the size of turbulent separation is reduced and the induced vortex smaller. Lift on the hydrofoil is higher and the induced drag lower than on efficient designs not having these features.

As a secondary effect, the part of viscous drag which is related to the shedding of the induced vortex is also decreased. By optimizing geometrical configurations of the plan shape of the maximum thickness line and/or the main line in relation to the leading and the trailing edges the areas of the highest pressure differences can be even better separated. This is achieved by inclining the maximum thickness line more towards the flow than the leading edge primarily in the region of the tip. However, the lengthwise distributions of angles $\alpha$, $\beta$, $\gamma$ and $\delta$ farther from the hydrofoil tip are also of importance, because the desired effects can be better attained with the flow that is as close to a streamline flow as possible. Therefore, the undisturbed flow velocity direction, the eventual presence of centrifugal or/and Coriolis force fields must be taken into account for optimum performance. The changes in the above angles should not be sudden in the areas where the direction of the flow does not form a large angle with the hydrofoil characteristic lines.

Very good results are attained when the foil characteristic lines i.e. the foil main line, the foil maximum thickness line, the foil leading and trailing edges are swept forward i.e. angle $\alpha$, $\beta$, $\gamma$ and $\delta$ are positive. However good results can be attained also when not all the above values of angles are simultaneously positive or/and with the foil characteristic lines, or some of them inclined forward in the region of the tip of the foil. This region, depending on the character of the flow and applications of a given particular foil can be defined as this part of the foil which lies within 50% of the foil length l from the foil tip, within 30% of the foil length l from the foil tip or within 10% of the foil length l from the foil tip. Other percentages of the foil length can also be used, the choice being dependent on the particular flow conditions in the tip region, along the whole hydrofoil and also flow interaction with other foils and or bodies, as for example the interaction of a ship stabiliser fin boundary layer or/and cavitation path with the ship hull or/and boundary layer of the ship hull or/and the ship propeller. Many hydrodynamic, aerodynamic design criteria should be taken into account as the foil efficiency, strength, flutter, vibration, generation of noise, mixing efficiency in a mixing vessel etc. From fluid mechanics point of view the general direction would be to choose higher percentages of the foil length l in order to determine the foil tip area which is desired to be raked forward, or to clarify the scope of this description, for foils which have low aspect ratios, while the smaller percentages of l would be appropriate for foils of higher aspect ratios. The above listed values of 50%, 30% and 10% of l are not the only possible ones, the intermediate values can be also chosen depending on relevant criteria as those, which were for example mentioned above. In cases of very low aspect ratio, even up to 100% of the foil length l i.e. the whole body of the foil would be qualified as a tip area. With geometrical aspect ratios smaller than one as considerable improvement of the flow and/or other important flow related features may be, in some flow situations, obtained with the whole body of the foil swept towards the flow. In such a case it would be most appropriate to qualify 100% of l as the tip area. The above value of geometrical aspect ratio of one is an indication only, and in a case similar flow situation is attained with a lower (or higher) value of aspect ratio, such a lower value (or higher value) should be used to determine the extent of the tip area. For aspect ratio much higher than one, like 2.0, 3.0, 5.0 and higher, a more regular flow leaves the designer more freedom as to what to regard as the foil tip area.

According to the present invention there is provided a foil dimensioned and proportioned so that the foil is adapted to be oriented to the direction of flow so that angle $\alpha$ is positive and at least 10° at any point within 50% of the foil length from the foil tip and at least one of angles $\beta$ and $\gamma$ is positive and at least 14° at any point within 50% of the foil length from the foil tip.

One of the families of the invented shapes of hydrofoils is characterised by the reduction of the high drag and low lift vortex enhancing area near to the tip. This is performed by gradually decreasing the chord length towards the hydrofoil tip, so that hydrofoil tip has a lower plan radius or is pointed. This has the advantages of reducing the length over which the induced vortex would develop as well as reducing the wetted area of the region where the boundary layer would be thickest and viscous drag most significant. These effects are further enhanced by the higher shear and more streamline flow in the region of the tip, as well as the gradual decrease of the pressure difference between the suction and the pressure sides, which accompany the gradual decrease of the chord length towards the foil tip. The proximity of the trailing edge which forms a larger angle with the undisturbed flow can facilitate some merging of the induced vortex with the trailing vortices which tend to be smaller and dissipate faster.

This is very well realised with the forward raked foils which have near to elliptical lengthwise chord distribution. Angle $\epsilon$ can be used as a measure of reduction of the undesirable vortex enhancing area near to the tip and a broad indication can be given that angle $\epsilon$ should best be smaller than or equal to 80°. However, with a near to elliptical lengthwise chord distribution in the tip area or along the whole foil, good results can be obtained with angles $\epsilon$ smaller than or equal to $89° - \alpha_t$, where $\alpha_t$ is the value of angle $\alpha$ at the point of the leading edge used to determine angle $\Gamma$. Very good results can be also attained with angle $\Gamma$ smaller than 60° or even 45° or angles $\Gamma$ smaller than $80° - \alpha_t$, $60° - \alpha_t$ or even $45° - \alpha_t$. Other numeric values could also be used above, both between 45° and 89° as well as below 45°, as the above used values are examples only, quoted to signal the order of magnitude of preferred values of angle $\gamma$.

A foil plan shape which is near to elliptical is known, also for unswept foils and for swept backward foils to give high lift and low drag foil characteristics. The nature of this invention is in particular to use forward rake for shapes which have similar to elliptical plan shapes of the foil.

Figure 5:
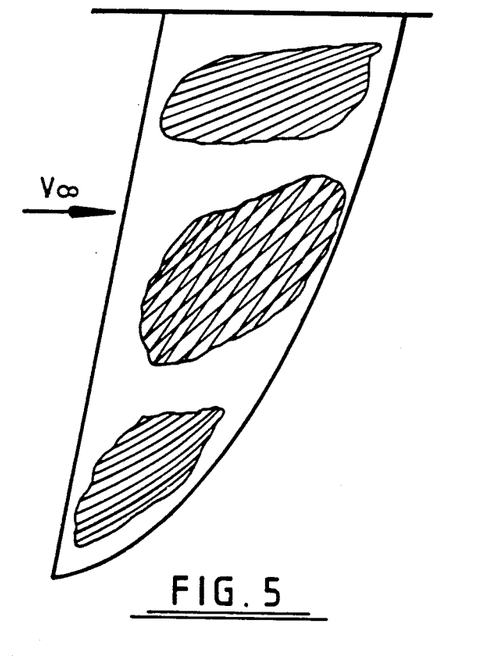
FIG. 5 is a diagrammatic side elevation of a hydrofoil in accordance with an embodiment of the invention, with parts cut away to show examples of orientation of strengthening elements for use techniques for strengthening the hydrofoil.

Elliptical or near to elliptical, foil shape, while combined with forward rake has the advantages of reduced undesirable vortex-enhancing area near to the foil tip, while the lengthwise trailing vortices distribution is close to optimal. For example plan shapes with straight or nearly straight leading edge over the whole foil length or only in the tip region and the shape of the trailing edge resulting from elliptical or near to elliptical chord distribution offer these advantages (FIG. 2f and FIG. 5).

The plan shape of the foil, can, in some cases, be defined by introducing limits on the radius of curvature of the leading and trailing edges. In particular a radius of curvature of an elliptical plan shape, which has been proved to possess very good flow properties over a high value of aspect ratios while combined with forward rake, can be used to mark restrictions on the preferred plan shapes. The value of this radius of curvature can be corrected with an arbitary coefficient in order to allow for those plan shapes, which are not strictly elliptical and which possess good flow properties. The values of such arbitary coefficients can be chosen as 1.2, 1.5, 2.0 or 5.0 for most foil shapes. However, for such foil shapes which are not very regular, like for a foil for which both angles $\alpha$ and $\delta$ simultaneously increase towards the foil tip, higher values of the coefficient of 7.0, 10.0 or 25.0 can be used. The values of the above coefficient can be varied over the foil length, and can be also taken different over the length of foil tip area and the remaining part of the foil. This can be done in order to provide additional means of controlling the foil plan area in order to optimise the design of any particular foil from the point of view of removing the undesirable area near to the tip versus the particular lift requirements, apart from the controlling means which were already mentioned.

Another measure of the size of the vortex enhancing area near to the tip apart from angle $\epsilon$, can be the chord/length at the foil tip. Good flow properties can be attained with the tip chord length not greater than 60% of the maximum chord length of the foil, or better if the tip chord length is smaller than 40%, 30% or even 20% of the maximum chord length of the foil..

These and other aspects of the invention will become apparent from the following description when taken in combination with the accompanying drawing, in which.

Reference is now made to FIGS. 4a to 4f of the drawings which depict hydrofoils according to the invention and which are characterised by the forward inclination of the entire or a major part of the leading edge.

The inclination of the leading edge creates a longitudinal flow along the edge. This prevents stagnation and reduces the thickness of the boundary layer, thus decreasing viscous drag. An additional effect is that, because of the above, laminar flow can be maintained over a larger area, thus for some applications the maximum thickness line can be moved towards the trailing edge. Longitudinal flow separation at higher angles of attack is less likely and the leading edge section radius can be modified accordingly. This can result in a flatter $C_C/C_L$ characteristic over a range of angles of attack and lower values of drag coefficient.

Modification of the section shapes depend on particular applications. On conventional hydrofoils, where the leading edge is often inclined backwards, the above advantages to the boundary layer are counterbalanced by accompanying increase of induced drag. For the required lift values these invented hydrofoils have a smaller area, which improves cavitation performance.

In the case of a propeller, pump, impeller or turbine rotor or vane, blades, where centrifugal and Coriolis forces occur, the hydrofoils have further advantages.

Due to radial component of the flow combined with the more advantageous shapes and decreased chord lengths of the hydrofoils, the paths of cavitation bubbles along the blade surface are reduced. Whenever a hydrofoil rotates (propellers, pumps, turbines etc.) a specific approach is necessary because due to the presence of the radial centrifugal force the physics of the flow is more complex than in an essentially progressive relative motion of a hydrofoil and a liquid. For the above progressive motion angle $\alpha$, of 11° to 14°, gives good results, however, the values of 15° to 19° are better in the region of the foil tip for example, within 50% of the length of l. Even better results are attained with the latter values if angle $\alpha$ is kept in this range for the whole hydrofoil length. For $\alpha$ greater than 20° the hydrodynamic situation still improves but care must be taken that the strength of the foil is sufficient, which may be more important than for lower angles $\alpha$. Angle $\gamma$ on the tip should best be 30° to 60° higher than the value of $\alpha$, however, a considerable variation can give good results and the above difference can rapidly decrease towards the foil base. Desirably $\beta$ or $\gamma$ are positive and at least 14° at any point within 50% of foil length l from the foil tip. It will be appreciated that the closer the values of $\beta$, $\gamma$ and $\alpha$ to the foil tip i.e. within 30% or 10% is preferred for producing a more desirable foil. Best results are attained with angles $\epsilon$ of the order of 50° to 65°, but with favourable chord length distribution in the tip region $\epsilon$ values of 66° to 75° can give very good results. For the rotational motion the above values of angles $\alpha$ and $\gamma$ should be increased depending on the centrifugal force effect on the flow.

A forward inclined portion of a hydrofoil can, however, be subjected to significant torsion combined with bending and has different flutter characteristics than those of commonly used designs. This is best illustrated in FIG. 5 which shows a hydrofoil which has been strengthened by applying high directional strength materials in the direction that is inclined at an acute angle, in general varying, to the main line. This material, or these materials when more than one set of directional strength provisions are chosen, are used in addition to reinforcements which have more isotropic two dimensional mechanical properties or which have higher stiffness in the longitudinal or/and transverse directions on the foil. The hereby described technique increases combined torsional and bending stiffness as well as producing a special antistalling effect. A distributed force applied at the hydrofoil tip causes less bending because the strengthening prevents the torsion of the leading edge of the section towards the higher angles of attack (and therefore increasing hydrdynamic forces). Simultaneously, the trailing edge of the hydrofoil is allowed to twist more easily towards decreasing the angle of attack. FIG. 5 illustrates an example only and the hereby described invented method of strengthening hydrofoils can be used with high modulus materials arranged in a few directions over a certain range of the acute angles as described above. Particular arrangements depend on applications and a wide range of static mechanical properties and dynamic response characteristics can be attained by a suitable combination of materials and their arrangement, in particular for composite materials.

Without departing from the scope of the invention it will be understood that although "hydrofoil" is used in the description with reference to incompressible fluid media it will be appreciated that the foil may be used in any gas liquid or in any multiphase mixture.

I claim:

1. A hydrofoil for use submerged in a liquid medium, where relative motion between every point of the hydrofoil and the liquid medium produces a flow across the hydrofoil and defines a direction of undisturbed flow in every point of said hydrofoil, said hydrofoil extending from a base to a tip and having a leading edge and a trailing edge, wherein said flow is in a direction from said leading edge to said trailing edge, and said hydrofoil having a pressure side and a suction side, wherein said flow around both said sides generates a pressure difference between said sides and produces a lift force perpendicular to the direction of said undisturbed flow and directed from said pressure side to said suction side;

said hydrofoil having a main line extending from said base to said tip, wherein said main line is the geometrical locus of centres of effort of sections of said hydrofoil by sectioning surfaces and said main line lies on a surface created by all mean lines of said sections and locations of maximum thickness of said sections define a maximum thickness line, wherein each of said sectioning surfaces passes through one endpoint on said leading edge and through one endpoint on said trailing edge, and said sectioning surfaces belong to a class of surfaces which includes planes used when said hydrofoil is engaged in a progressive motion and which includes rotational surfaces meant as surfaces of revolution described by said hydrofoil, said rotational surfaces being used whenever said hydrofoil is engaged in a rotational motion, said sectioning surfaces being shaped such that said sections are lead between said endpoints approximately in line with streamlines of said flow;

said hydrofoil defining a chord surface formed by chords of said sections, wherein each chord joins said endpoints along said sectioning surface to define a chord length;

said hydrofoil having an angle $\alpha$, said hydrofoil having at least one of an angle $\beta$ and an angle $\gamma$, and said hydrofoil having an angle $\delta$, said angles $\alpha$, $\beta$, $\gamma$ and $\delta$ being respectively angles of sweep of said leading edge, said main line, said maximum thickness line and said trailing edge, where each of said angles of sweep is measured in relation to a direction perpendicular to the direction of said undisturbed flow and tangent to said chord surface of said hydrofoil at that point of said chord surface which is nearest to that point of one of said edges and said lines in which a corresponding one of said angles of sweep is measured, each of said angles of sweep being determined in at least one point of the corresponding one of said lines and said edges, wherein each of said angles of sweep has a positive value for those locations where the corresponding one of said lines and said edges is swept forward;

said hydrofoil, whenever said hydrofoil belongs to one of groups which include round ended hydrofoils and sharp ended hydrofoils which groups both characterize by said hydrofoil having a single point on said hydrofoil tip being furthermost from said hydrofoil base, for said hydrofoil belonging to one of groups which include round ended hydrofoils and sharp ended hydrofoils being defined an angle $\epsilon$ which is the absolute value of a difference between said angle $\alpha$ and said angle $\delta$, which whenever said hydrofoil is sharp ended are for the purpose of determining said angle $\epsilon$ measured at said hydrofoil tip, and whenever said hydrofoil is round ended said angle $\epsilon$ is measured between the tangents to said leading edge and to said trailing edge at points which are 7% of the length of said hydrofoil distant from that point of said hydrofoil tip, which is furthermost from said hydrofoil base;

this invention comprising said hydrofoil being orientable to the direction of said undisturbed flow such that;

a: in at least one point along said leading edge said angle $\alpha$ is positive and greater than or equal to 10°;

b: and in at least one point along said hydrofoil, at least one of said angle $\beta$ and said angle $\gamma$ is positive and greater than or equal to 14°;

c: and the chord length at the hydrofoil tip is not greater than 40% of a maximum chord length of said hydrofoil;

d: and whenever said hydrofoil belongs to one of groups which include round ended hydrofoils and sharp ended hydrofoils, said angle $\epsilon$ is smaller than the difference of 90° minus an angle $\alpha_t$, said angle $\alpha_t$ having the value of angle $\alpha$ at the hydrofoil tip measured at that point of said leading edge which is used to determine said angle $\epsilon$.

2. A hydrofoil as claimed in claim 1 wherein said hydrofoil is used to stabilise the motion of any vessel.

3. A hydrofoil as claimed in any preceding claim for use with a hydrofoil vessel which uses hydrofoil lift to support the whole or part of the vessel weight.

4. A hydrofoil as claimed in claim 1 for use with a vessel, where lift on said hydrofoil is used to counteract buoyancy forces acting on said vessel.

5. A hydrofoil as claimed in claim 1 for use with a vessel, wherein lift on said hydrofoil is used to control, prevent, or reduce motion of said vessel in any direction.

6. A hydrofoil as claimed in claim 1 wherein said hydrofoil is used as a blade such as a propeller blade used in rotational motion.

7. A hydrofoil as claimed in claim 1 wherein at least one of the average value of angle $\beta$ over the hydrofoil length and the average value of angle $\gamma$ over the hydrofoil length is positive and greater than or equal to 14°.

8. A hydrofoil as claimed in claim 1 wherein the average value of angle $\alpha$ over the hydrofoil length is positive and greater than or equal to 10°.

9. A hydrofoil as claimed in claim 1 wherein at at least one point within 30% of the hydrofoil length from the hydrofoil tip angle $\alpha$ is positive and at least 10° and at least one of angle $\alpha$ and angle $\gamma$ is positive and at least 14°.

10. A hydrofoil as claimed in claim 1 wherein at at least one point within 10% of the hydrofoil length from the hydrofoil tip angle $\alpha$ is positive and at least 10° and at least one of angle $\beta$ and angle $\gamma$ is positive and at least 14°.

11. A hydrofoil as claimed in claim 1 wherein angle $\epsilon$ is equal to or smaller than 80°.

12. A hydrofoil as claimed in claim 1 wherein said hydrofoil has:

(a) the chord length at any actual value of z smaller than or equal to M, where $$M = 1.5b\{1-(z/l)^2\}^{\frac{1}{2}}$$ or (b) the radius of curvature of the leading or trailing edges of the foil is at any actual value of z smaller than or equal to R, where $$R = 25.0\{l^2(l^2-z^2)(1+\tan^2 a) + b^2 z^2 + 2lbz(l^2-z^2)^{\frac{1}{2}}\tan a\}^{3/2} l^{-4} b^{-1}$$

where z = a lengthwise hydrofoil coordinate of any point of said hydrofoil leading or trailing edge measured from 0 at the hydrofoil base to at the hydrofoil tip;

b = the maximum chord length of the hydrofoil;

$a$ = the actual value of angle $\alpha$ at the given value of coordinate z.

13. A hydrofoil as claimed in claim 1 wherein said hydrofoil is strengthened at or in proximity to said hydrofoil surface or any part of the surface by at least one layer or group of strengthening elements said layer has at least one direction of increased strength arranged approximately along the hydrofoil surface and inclined at varying or constant angle to the main line of the hydrofoil.

14. A hydrofoil as claimed in claim 13 wherein said material is selected from the group comprising a high tensile, high compression or high modulus of elasticity metallic, non-metallic, compound, fibre, rod, wire, frame, matt or tissue material.

15. A hydrofoil as claimed in claim 1 wherein at at least one point within 50% of said hydrofoil length from said hydrofoil tip angle $\alpha$ is positive and at least 10° and at least one of angle $\beta$ and angle $\gamma$ is positive and at least 14°.

* * * * *

UNITED STATES PATENT AND TRADEMARK OFFICE
CERTIFICATE OF CORRECTION

PATENT NO. : 4,949,919

DATED : Aug. 21, 1990

INVENTOR(S) : Krzysztof Wajnikonis

It is certified that error appears in the above-identified patent and that said Letters Patent is hereby corrected as shown below:

Title Page, (76) Inventor:
delete old, now incorrect inventor's address and substitute with --9 Concorde Close, Lampton Road, Hounslow, Middlesex TW3 4DG, Great Britain.--.

Column 1, line 24:
Delete "V" and substitute --$V_\infty$-- therefor.

Column 4, line 4:
replace "top" with --tip--.

Column 5, line 28:
replace "as" with --a--.

Column 6, line 11:
replace "Γ" with --$\epsilon$--.

Column 6, line 12:
replace "Γ" with --$\epsilon$--.

Column 6, line 13:
replace "Γ" with --$\epsilon$--.

Column 6, line 18:
replace "γ" with --$\epsilon$--.

Column 6, line 41:
replace "value" with --range--.

UNITED STATES PATENT AND TRADEMARK OFFICE
CERTIFICATE OF CORRECTION

PATENT NO. : 4,949,919

DATED : Aug. 21, 1990

INVENTOR(S) : Krzysztof Wajnikonis

It is certified that error appears in the above-identified patent and that said Letters Patent is hereby corrected as shown below:

Column 7, line 39:
replace "$C_C/C_L$" with --$C_D/C_L$--.

Column 7, line 49:
replace "vane, blades" with --vane blades--.

Column 8, lines 6 to 8:
delete text starting in line 6 with "It will" and finishing in line 8 with "desirable foil.", including the above quoted words.

Column 8, line 34:
replace "hydrdynamic" with --hydrodynamic--.

Column 9, line 25 (Claim 1):
insert a spacing between "$\delta$" and "being".

Column 9, line 60 (Claim 1):
replace ";" with ##:##.

Column 10, lines 54 and 55 (Claim 12):
replace "tan" with ##$\tan^2 \alpha)+$## in line 54, delete "$^2 \alpha)$" in line 55.

UNITED STATES PATENT AND TRADEMARK OFFICE
CERTIFICATE OF CORRECTION

PATENT NO. : 4,949,919

DATED : Aug. 21, 1990

INVENTOR(S) : Krzysztof Wajnikonis

It is certified that error appears in the above-identified patent and that said Letters Patent is hereby corrected as shown below:

Column 10, line 59 (Claim 12):
insert ## $\ell$ ## between "base to" and "at the".

Signed and Sealed this

Third Day of March, 1992

Attest:

HARRY F. MANBECK, JR.

*Attesting Officer*  *Commissioner of Patents and Trademarks*